United States Patent
Kim et al.

(10) Patent No.: US 9,192,970 B2
(45) Date of Patent: Nov. 24, 2015

(54) BANKING STRUCTURE USING ROCKS PRODUCING ACID DRAINAGE

(71) Applicant: KOREA INSTITUTE OF GEOSCIENCE AND MINERAL RESOURCES (KIGAM), Daejeon (KR)

(72) Inventors: Jae Gon Kim, Daejeon (KR); Young Suk Song, Daejeon (KR); Chul Min Chon, Daejeon (KR); In Hyun Nam, Daejeon (KR); Jin Soo Lee, Daejeon (KR)

(73) Assignee: KOREA INSTITUTE OF GEOSCIENCE AND MINERAL RESOURCES (KIGAM), Daejeon (KR)

( * ) Notice: Subject to any disclaimer, the term of this patent is extended or adjusted under 35 U.S.C. 154(b) by 0 days.

(21) Appl. No.: 14/243,193

(22) Filed: Apr. 2, 2014

(65) Prior Publication Data
US 2014/0294509 A1    Oct. 2, 2014

(30) Foreign Application Priority Data
Apr. 2, 2013    (KR) .................. 10-2013-0035567

(51) Int. Cl.
*B09C 1/08*        (2006.01)
*E02D 3/12*        (2006.01)

(52) U.S. Cl.
CPC .... *B09C 1/08* (2013.01); *E02D 3/12* (2013.01)

(58) Field of Classification Search
CPC ............... B09C 1/08; E02D 3/11; E02D 3/12; E02D 17/18; E02D 29/02
See application file for complete search history.

(56) References Cited

U.S. PATENT DOCUMENTS

| 4,252,462 | A | * | 2/1981 | Klingle et al. | 405/129.7 |
| 5,599,139 | A | * | 2/1997 | Chewning et al. | 405/129.6 |
| 8,376,657 | B2 | * | 2/2013 | Dudding | 405/129.95 |
| 2001/0032725 | A1 | * | 10/2001 | Harrington | 172/128 |
| 2008/0069642 | A1 | * | 3/2008 | Ayers et al. | 405/129.85 |
| 2008/0085160 | A1 | * | 4/2008 | Taylor | 405/129.2 |
| 2008/0221379 | A1 | * | 9/2008 | Barnes | 588/318 |
| 2009/0050025 | A1 | * | 2/2009 | Wissa et al. | 106/786 |
| 2013/0045052 | A1 | * | 2/2013 | Gusek | 405/128.75 |

FOREIGN PATENT DOCUMENTS

WO    WO 2004022255 A2 *   3/2004    ............... B09B 1/00

* cited by examiner

*Primary Examiner* — Benjamin Fiorello
(74) *Attorney, Agent, or Firm* — Ladas & Parry LLP (57) ABSTRACT

Provided is a banking structure using a rock producing acid drainage. The banking structure includes a banking layer including the rock having acid drainage production possibility and an inhibitor for reducing acid drainage production potential of the rock, a capillary breaker layer stacked between a lower portion of the banking layer and an underground water level surface to prevent underground water from being introduced into the banking layer by a capillary phenomenon, and a finishing layer stacked on an upper portion of the banking layer according to a use thereof.

13 Claims, 6 Drawing Sheets

FIG. 1

| Soil Texture | Capillary Height |
|---|---|
| Sand | 2 - 17 |
| Silt | 100 |
| Clay | >100 |

BANKING STRUCTURE USING ROCKS PRODUCING ACID DRAINAGE

CROSS-REFERENCE TO RELATED APPLICATIONS

This U.S. non-provisional patent application claims priority under 35 U.S.C. §119 of Korean Patent Application No. 10-2013-0035567, filed on Apr. 2, 2013, the entire contents of which are hereby incorporated by reference.

BACKGROUND OF THE INVENTION

The present invention relates to a banking technique in civil engineering and construction fields, and more particularly, a banking structure using rocks producing acid drainage as backing materials.

Sulfide minerals may be minerals that are commonly produced from rocks and sediments. The sulfide minerals may be produced by various geological processes such as diagenesis of sediments deposited under reducing environments, deposition from hot water, and reaction between hot water and rocks. Sulfide minerals may be produced from various kinds of rocks according to generation environments. Iron pyrites may be the most representative sulfide minerals.

In case of the iron pyrites, the iron pyrites may be stabilized if they exist in the underground or under a water surface in a state where they are blocked from the atmosphere. However, if the iron pyrites are exposed to the surface of the earth by underground excavation, drainage, dredge, and the like, the iron pyrites meet oxygen and thus are oxidized to produce acid drainage.

The drainage produced by the oxidation of the sulfide minerals may have acidity. Thus, the drainage may contain a large amount of Fe and heavy metals that are eluted from the sulfide minerals. Also, since the drainage generated by the oxidation of the sulfide minerals dissolves aluminum silicate minerals, the drainage may contain a large amount of Al that is eluted from the aluminum silicate minerals.

In recent years, large scale underground excavation frequently occurs due to road building and residential land and industrial complex development. Rocks containing the sulfide minerals exposed to the surface of the earth during the underground excavation may produce the acid drainage to cause various problems such as environmental pollution, corrosion of structures, vegetation withering, scenery damage, rock weathering promotion, reduction of ground stability, and the like. Thus, adequate processing and recycle of the rocks containing the sulfide minerals produced from the large scale underground excavation sits are coming to the fore as pending issues in construction sites.

Typically, the sulfide mineral rocks may be buried for processing. Here, when the sulfide mineral rocks are buried, a collecting well, a perforated drainpipe, a pond, and a waterproof sheet, which process percolating water, are applied to minimize effects that have an influence on environments. However, the construction method may be complicated, and a relatively large amount of cost and time may be required. Also, the perforated drainpipe and waterproof sheet may be frequently damaged when constructed and thus deteriorated in effectiveness.

Also, due to leakage of aggregate, needs for recycling the excavated rocks into banking materials are increasing. Thus, although there is an attempt to recycle the rocks into the banking materials, a technique for solving problem of all sorts due to the oxidation of the sulfide minerals within the rocks through penetration of rainwater and the contact with air has not been proposed. Thus, the industrial recycling of the rocks is investigated only negative attention.

SUMMARY OF THE INVENTION

The present invention provide a banking structure having improved performance to recycle rocks producing acid drainage into banking materials so that the acid drainage does not have an influence on the surrounding soil, river, and underground water.

Embodiments of the present invention provide a banking structure using a rock producing acid drainage, the banking structure including: a banking layer including the rock having acid drainage production possibility and an inhibitor for reducing acid drainage production potential of the rock; a capillary breaker layer stacked between a lower portion of the banking layer and an underground water level surface to prevent underground water from being introduced into the banking layer by a capillary phenomenon; and a finishing layer stacked on an upper portion of the banking layer according to a use thereof.

In some embodiments, the inhibitor may include at least one of a coating agent for spraying and applying a solution in which hydrogen peroxide and phosphate are mixed onto the rock and an alkaline agent for precipitating $Fe^{3+}$ that acts as the oxidizing agent of the acid rock.

In other embodiments, the banking structure may further include a lower blocking layer formed of a material having a low permeability coefficient and stacked between the banking layer and the capillary breaker layer to prevent the acid drainage produced from the rock from being discharged downward.

In still other embodiments, the banking structure may further include an upper blocking layer formed of a material having a low permeability coefficient and stacked on an upper portion of the banking layer to prevent rain from being introduced into the rock.

In even other embodiments, a neutralizing agent for neutralizing the acid drainage produced from the rock may be mixed into the lower blocking layer, and the neutralizing agent may be selectively mixed into the upper blocking layer.

In yet other embodiments, the banking structure may further include a cover layer containing a neutralizing agent for neutralizing the acid drainage produced from the banking layer and an organic matter (that is dissolved by dissolved by microorganisms using oxygen) for preventing oxygen in the atmosphere or dissolved oxygen of rain from being introduced into the banking layer, wherein the cover layer is formed on a side surface of the banking layer. The neutralizing agent and the organic matter may be mixed in a range of about 3% by weight to about 15% by weight with respect to the whole cover layer. Also, plants and trees may be planted in the cover layer to continuously supply the organic matter, and the cover layer may have a thickness of about 30 cm to about 70 cm.

In further embodiments, the banking structure may further include a drain layer on a lower side surface of the banking layer, wherein a neutralizing agent may be disposed in the drain layer.

In still further embodiments, a monitoringwell may be installed on a lower side surface of the cover layer in a downward direction to confirm whether the acid drainage is discharged downward.

In even further embodiments, when acid production potential of the rock is above a reference value, upper and lower portions of the banking layer may have the same width, and when the acid production potential of the rock is below the reference value, the upper portion of the banking layer may have a width greater than that of the lower portion to increase a usage amount of rock.

In yet further embodiments, a horizontal face and a slope face may be alternately formed on one side surface of the banking layer, and a neutralizing drain layer in which gravels and a neutralizing agent are mixed may be further disposed on the horizontal face.

In much further embodiments, the banking structure may further include a breast wall on a side surface of the banking layer, wherein the neutralizing drain layer in which the gravels and the neutralizing agent are mixed may be further disposed on a portion of the banking layer that is in contact with an inner surface of the breast wall.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Hereinafter, a banking structure using rocks producing acid drainage according to a first embodiment of the present invention will be described in detail with reference to the accompanying drawings.

Figure 1:
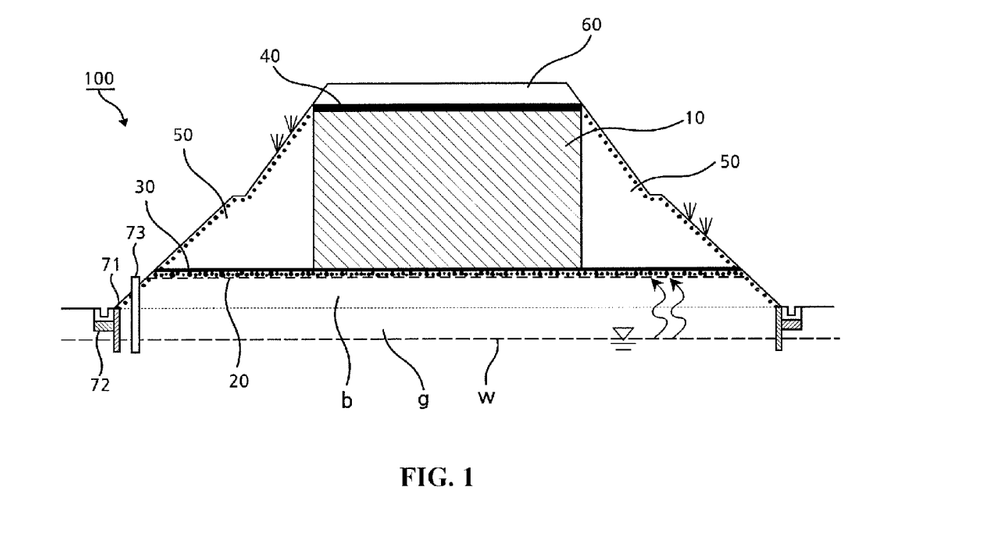
FIG. 1 is a schematic cross-sectional view of a banking structure according to a first embodiment of the present invention.

FIG. 1 is a schematic cross-sectional view of a banking structure according to a first embodiment of the present invention.

Referring to FIG. 1, a banking structure 100 according to the first embodiment of the present invention includes a banking layer 10, a capillary breaker layer 20, a lower blocking layer 30, an upper blocking layer 40, and a cover layer 50.

The banking structure 100 according to the first embodiment is constructed in order of the capillary breaker layer 20, the lower blocking layer 30, the banking layer 10, the upper blocking layer 40, and the cover layer 50. However, for convenience of description, the banking layer 10 will be described first.

The banking layer 10 may be a layer that is formed by mixing the rocks producing the acid drainage and soil to laminate and compact the mixture. An important feature of the present invention is that the rocks are utilized as the banking materials. The rocks may be generated by excavating the ground or slope. The rocks may contain minerals, which produce acid drainage, such as sulfide minerals. Hereinafter, rocks that can produce the acid drainage may be commonly called the "rocks".

However, when the rocks are used as the banking materials, the rocks may meet oxidizing agents to produce the acid drainage. Here, the acid drainage may be permeated downward to contaminate underground water or introduced into rivers together with rain to contaminate the rivers, or may act as the leading cause of soil contaminant.

As a result, if it is intended to utilize the rocks as the banking materials, it is important to prevent the acid drainage from being produced from the banking layer. For this, it may prevent the rocks from contacting materials that act as the oxidizing agents, or the oxidizing agents itself may be removed to essentially prevent the acid drainage from being produced from the rocks.

First, an oxidation mechanism of iron pyrites that are representative sulfide minerals (acidic rocks) will be described below.

$$FeS_2 + 3.5O_2 + H_2O \rightarrow Fe^{2+} + 2SO_4^{2-} + 2H^+$$

$$Fe^{2+} + 0.25O_2 + H^+ \rightarrow Fe^{3+} + 0.5H_2O$$

$$Fe^{3+} + 3H_2O \rightarrow Fe(OH)_3 + 3H^+$$

$$FeS_2 + 14Fe^{3+} + 8H_2O \rightarrow 15Fe^{2+} + 2SO_4^{2-} + 16H^+$$

As expressed in the chemical reaction formula, it is seen that an oxidizing agent of an iron pyrite is $O_2$ 과 $Fe^{3+}$. In the current embodiment, a rock may be coated with a coating agent to prevent the rock from contacting the oxidizing agent. When a surface of the rock is stably coated, the contact between the iron pyrite and the oxidizing agent may be blocked to prevent the iron pyrite from being oxidized. Various materials may be used as an inhibitor (coating agent). In the current embodiment, a solution in which phosphate and $H_2O_2$ are mixed may be used as the inhibitor. In more detail, a solution containing 0.01M of $KH_2PO_4$ and 0.02M of $H_2O_2$ may be used as the coating agent. When the solution is sprayed onto the iron pyrite, iron phosphate having low solubility may be generated on a surface of the iron pyrite. The iron phosphate applied to the surface of the iron pyrite may block the reaction between $O_2$ and $Fe^{3+}$ that are oxidizing agents and the iron pyrite to prevent the acid drainage from being produced.

Also, the inhibitor for removing the oxidizing agent itself may be used in the present invention.

During or after the construction of the banking structure, rain or air containing dissolved oxygen may be permeated into the banking layer. As expressed in the chemical reaction formula, the iron pyrite may be oxidized first by the dissolved oxygen contained in the rain. Here, the $Fe^{3+}$ that is produced during the reaction process may act as the oxidizing agent of the iron pyrite.

The $Fe^{3+}$ may be precipitated by using the inhibitor and then removed. That is, when an alkaline agent ($OH^-$) is put into the $Fe^{3+}$, $Fe(OH)_3$ may be precipitated to inactivate the oxidizing agent. Examples of the alkaline agent that is easily acquired may include steel slag, limestone, calcium magnesium, red mud, and the like. In the current embodiment, alkali production potential of the alkaline agent may be measured, and then an amount of alkaline agent corresponding to net acid production potential (NAPP) of the rock may be put.

As described above, the rocks that are capable of producing the acid drainage may be used as the banking materials in the banking structure 100. Also, the rocks may be coated with the coating agent to block the contact with the oxidizing agent, or Fe3+ that acts as the oxidizing agent may be precipitated in a solid state by using the inhibitor to inactivate the oxidizing agent, thereby basically prevent the acid drainage from being produced.

Also, to prevent the acid drainage from being produced from the rock within the banking layer 10, it is necessary to prevent the underground water containing the dissolved oxygen (oxidizing agent) from being introduced into the banking layer 10. Thus, to prevent the introduction of the underground water, the capillary breaker layer 20 is provided.

Figure 2:
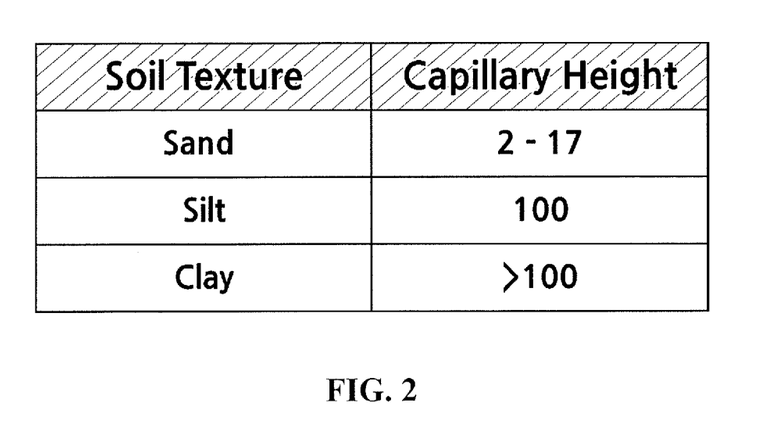
FIG. 2 is a graph for explaining a capillary height according to a soil texture.

Even though the banking layer 10 is banked on an upper portion of an underground water level, the underground water may reach the banking layer 10 through a capillary phenomenon. As illustrated in Table of FIG. 2, a capillary height may vary according to a soil texture. That is, the more the soil decreases in particle size, the capillary height increases. If it is apprehended that the underground water containing the dissolved oxygen ascends by the capillary phenomenon to react with the sulfide minerals, thereby producing the acid drainage, the capillary breaker layer having a thickness of about 30 cm by using a material having a large size such as gravels to prevent the underground water from ascending by the capillary phenomenon.

The capillary breaker layer 20 may prevent the underground water from being introduced upward into the banking layer 10. Furthermore, the capillary breaker layer 20 may prevent the acid drainage produced in the banking layer 10 from being introduced downward. Although an object of the present invention is to prevent the acid drainage from being produced from the banking layer 10, the acid drainage may be partially produced from the banking layer 10. Thus, it is necessary to prepare a countermeasure with respect to the production of the acid drainage in the banking layer 10. The capillary breaker layer 20 may have large porosity to easily introduce the acid drainage produced in the banking layer 10 into the underground water thereunder. Thus, in the first embodiment of the present invention, the lower blocking layer 30 may be disposed between the banking layer 10 and the capillary breaker layer 20 to prevent the acid drainage from being introduced into the underground.

That is, the lower blocking layer 30 may be stacked on the capillary breaker layer 20 by using a material having low permeability such as shale or clay to block the acid drainage. Here, a material having permeability of below $10^{-5}$ cm/sec may be used for the lower blocking layer 30.

Also, a neutralizing agent such as limestone powder may be mixed into the lower blocking layer 30 to neutralize the acid drainage. In the current embodiment, about 5 weight by % of the limestone powder with respect to the whole lower blocking layer 30 may be mixed into the lower blocking layer 30.

The rain or air may be introduced into an upper portion of the banking layer 10. To prevent this, in the first embodiment of the present invention, the upper blocking layer 40 is formed. The upper blocking layer 40 may be stacked between a finishing layer 60 (that will be described later) and the banking layer 10. In material features, the upper blocking layer may be formed of a material having low permeability such as shale or clay, like the lower blocking layer 30. However, the neutralizing agent such as the limestone powder may be selectively adopted. That is, even though the acid drainage is produced from the banking layer 10, it may be unnecessary to neutralize the acid drainage at the upper portion of the banking layer 10 because the acid drainage mainly moves downward. However, in aspects of enhancing the stability, the neutralizing agent may be mixed.

Also, in the banking structure 100 according to the first embodiment of the present invention, the cover layer 50 may be formed on a side surface of the banking layer 10. For example, if the banking structure 100 is used for the road construction, the cover layer 50 may be inclinedly formed on each of both sides of the banking layer 10.

As illustrated in FIG. 1, the cover layer 50 may be inclinedly filed on both sides of the banking layer 10. The cover layer 50 may also prevent the oxidizing agent from being introduced as well as prevent the acid drainage that may be produced in the banking layer 10 from being discharged.

The cover layer 50 may solve the above-described concerns by mixing the neutralizing agent and organic matter into the soil. First, to prevent the dissolved oxygen contained in the rain from being introduced, an organic matter may be added to the cover layer 50. Microorganisms for dissolving the organic matter while consuming oxygen may exist in the soil forming the cover layer 50. Thus, to remove the dissolved oxygen contained in the rain, the organic matter that is dissolved by the microorganisms while the microorganisms consume the dissolved oxygen is provided. In the current embodiment, decomposed manure may be used as the organic matter.

However, since the organic matter is dissolved by the microorganisms, the organic matter may be periodically put. Thus, although the organic matter is mixed into the cover layer 50 when the banking structure 100 is initially installed, plants and trees may be planted in the cover layer 50 to provide the organic matter into the cover layer 50 in the long term in the current embodiment. This is done because the organic matter may be continuously supplied from fallen leaves or roots. When the plants and trees are planted, it may prevent the cover layer 50 mainly formed on the slope from being swept by the rain to secure stability. If the rain passes through soil containing about 5% of organic matter, it is known that the dissolved oxygen contained in the rain is exhausted within a range of about 30 cm to about 70 cm. Thus, the thickness of the cover layer 50 may be adequately determined within the above-described range.

Also, the acid drainage produced in the banking layer 10 may be discharged through the cover layer 50 by the capillary phenomenon in the dry season. In the present invention, the neutralizing agent may be mixed into the cover layer 50 to neutralize the acid drainage. In the current embodiment, the limestone powder having high neutralization potential and low harm in the plants and trees or limestone powder having a silt diameter may be used as the neutralizing agent.

About 3% by weight or about 15% by weight of organic matter and limestone may be contained in the cover layer 50 in consideration of the stability, the dissolved oxygen, the removing performance, and the neutralization potential in the cover layer 50.

Also, since it is apprehended that the cover layer 50 is swept by the rain, artificial soil containing seeds (mixture of the plants and trees), medium textured soil, nourishments, organic matters, latex thickeners, natural fiber materials may be contained in the cover layer 50 to grow trees and plants. The artificial soil may have a thickness of about 5 cm or less. Also, the artificial soil may be stably attached to the slope by using a core net.

Also, the finishing layer 60 may be stacked on the upper blocking layer 40 according to use. In case of road pavement, the roadbed or a packing layer may be formed as the finishing layer 60. In case of the packing layer, since the packing layer is provided as a complete impermeability layer, the packing layer may act as the upper blocking layer without forming the upper blocking layer 40.

As described above, in the first embodiment of the present invention, the oxidization of the sulfide minerals may be prevented in the banking layer containing the sulfide minerals to restrict the production of the acid drainage. In addition, the introduction of the rain or air into the banking layer may be prevented to prevent the rain or air from acting as the oxidizing agent, and inversely, the discharge of the acid drainage produced from the banking layer to the outside may be prevented to stably recycle the rocks containing the sulfide minerals.

Also, the banking structure 100 according to the first embodiment of the present invention may include a drain system. Particularly, a vertical drain layer 71 and a horizontal drain layer 72 are formed on a lower portion of the side surface of the banking layer 10. The vertical drain layer 71 and the horizontal drain layer 72 installed in the lower end of the banking layer 10 should have a function that can neutralize the acid drainage. The vertical drain layer 71 using the limestone may be formed on an end of the cover layer 50 to block the movement of the acid drainage produced in a surface f the cover layer 50 formed on the slope. Also, the limestone and gravels may be disposed on bottoms of the vertical drain layer 71 and the horizontal drain layer 72 to allow the limestone to react with the acid drainage, thereby protecting the drains.

Also, to monitor whether the acid drainage is produced in the banking layer 10 and the discharge of the acid drainage to the outside in respect of the maintaining and repairing of the banking structure 100, a monitoringwell 73 may be installed on a side of a lower end of the cover layer 50 to periodically measure pH and concentration of heavy metals.

Also, in the present invention, processes for researching geographical features and underground water floodgates and evaluating the probability in the production of the acid drainage from the rocks and the discharge of harmful elements may be previously performed to determine a usage amount of rocks containing the sulfide minerals, thereby changing a shape of the banking layer 10.

The geographical feature and underground water floodgate research for evaluating hydraulic features in the banking target area may be important in anticipation of the moisture movement in the banking layer after being banked. Particularly, the underground water level may be crucial data for determining a position of the capillary breaker layer 20. Thus, the underground water level may be grasped in the dry and rainy seasons so that the capillary breaker layer 20 is disposed above the underground water level in the rainy season.

Figure 3:
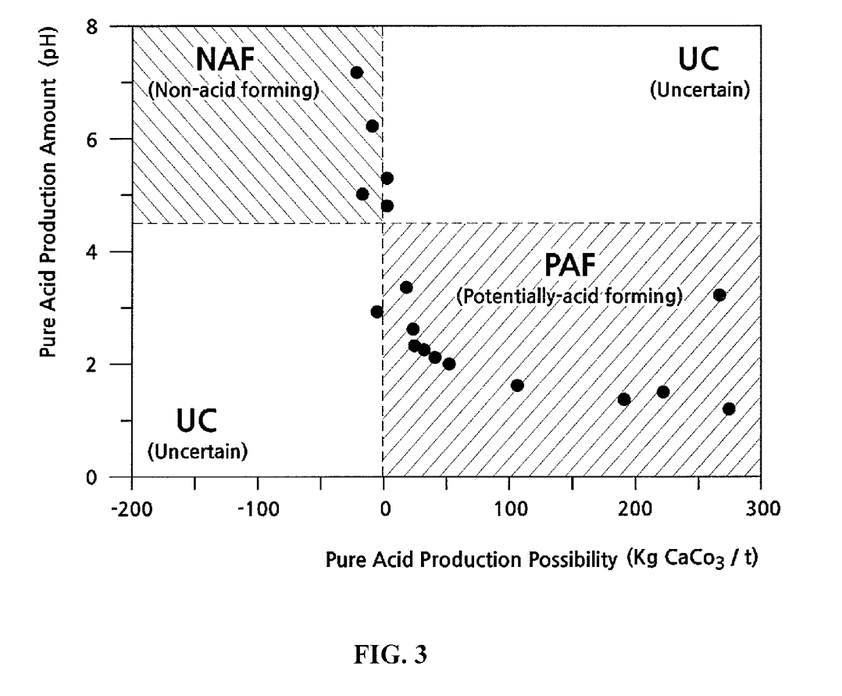
FIG. 3 is a graph for explaining evaluation of acid drainage producing probability in rocks.

As shown in Table of FIG. 3, the production possibility of the acid drainage in the rocks may be determined by the content of the sulfide minerals that are sources in the production of the acid drainage and the neutralization potential of the rocks with respect to the acid. Maximum potential acidity (MPA) of the rocks may be calculated through the following expression by measuring the content of the sulfide minerals.

MPA(kg $CaCO_3$/t)=sulfur content(%)×31.213

The neutralization potential (NP) may be calculated through the following expression by reacting the rocks with about 1N HCl and measuring remaining $H^+$ by using about 0.1N or about 0.5N NaOH.

NP(kg $CaCO_3$/t)={(N×HCl amount(ml)−N×NaOH amount (ml))×50}/sample weight(g)

Here, net acid production potential (NAPP) may be obtained by reducing the NP at the MPA, as shown in the following expression.

NAPP=MPA−NP

Net acid generation (NAG) may be obtained by measuring pH of a solution after rock sample powder (about 2.5 g) reacts with about 15% $H_2O_2$. If a pH of the NAG is below about 4.5, and the NAPP is above zero, the rocks may have production possibility of the acid drainage. Also, if a pH of the NAG is above about 4.5, and the NAPP is below zero, the production possibility of the acid drainage may be low.

The rocks that produce the acid drainage may be classified into a very risk level when the pH of the NAG is below about 3.5 and into a risk level when the pH of the NAG is above 3.5. In the present invention, the pH of the NAG may be determined in use of the rocks with respect to the pH 3.5. However, the reference value may vary according to environment regulation conditions. Also, in the present invention, the concentration of the heavy metals in the solution may be measured in the NAG test to evaluate the production possibility of the harmful elements.

As described above, when the acid production potential is above the reference value according to the evaluation of the acid production possibility of the rocks, as described in the first embodiment of FIG. 1, the upper and lower portions of the banking layer 10 may have the same width. On the other hand, if the acid production potential is below the reference value, the banking layer 10 may be widened, as described in a modified example of the first embodiment of FIG. 4. In the modified example 110 of the first embodiment of FIG. 4, the banking layer 10 may have a trapezoid shape having a relatively wide lower width than an upper width to increase an usage amount of rocks. In the modified example 110 of the first embodiment of FIG. 4, since the rocks are different in only usage amount according to the shape of the banking layer 10, its detailed description will be substituted with that of the first embodiment.

Figure 4:
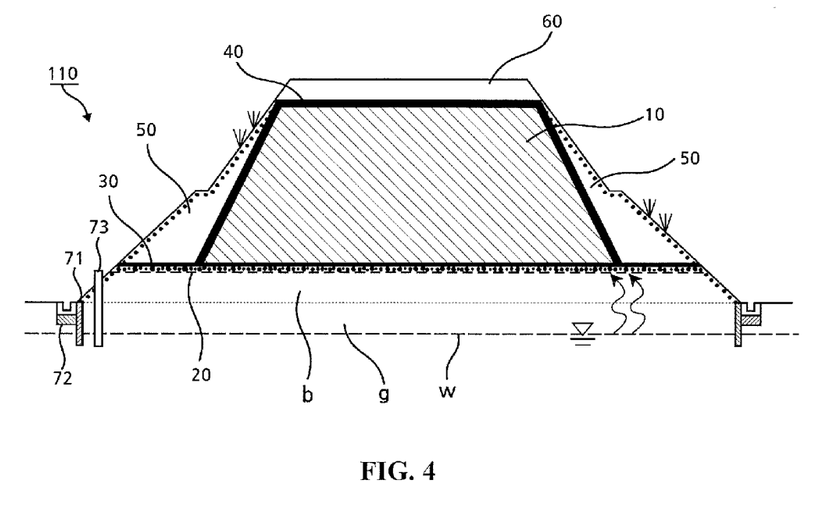
FIG. 4 is a schematic cross-sectional view illustrating a modified example of the backing structure according to the first embodiment of the present invention.
Figure 5:
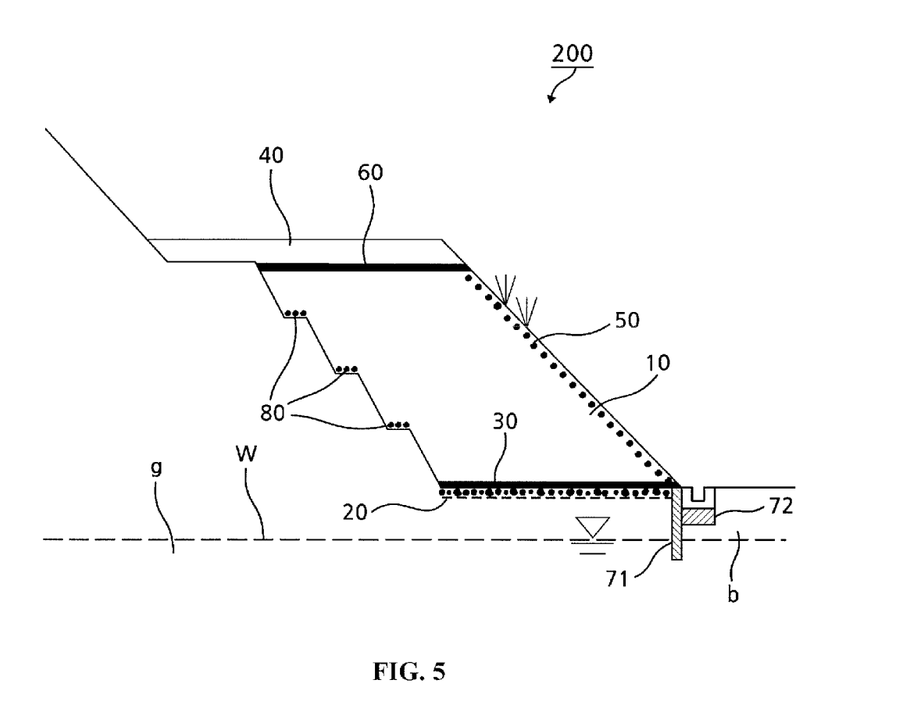
FIG. 5 is a schematic cross-sectional view of a banking structure according to a second embodiment.
Figure 6:
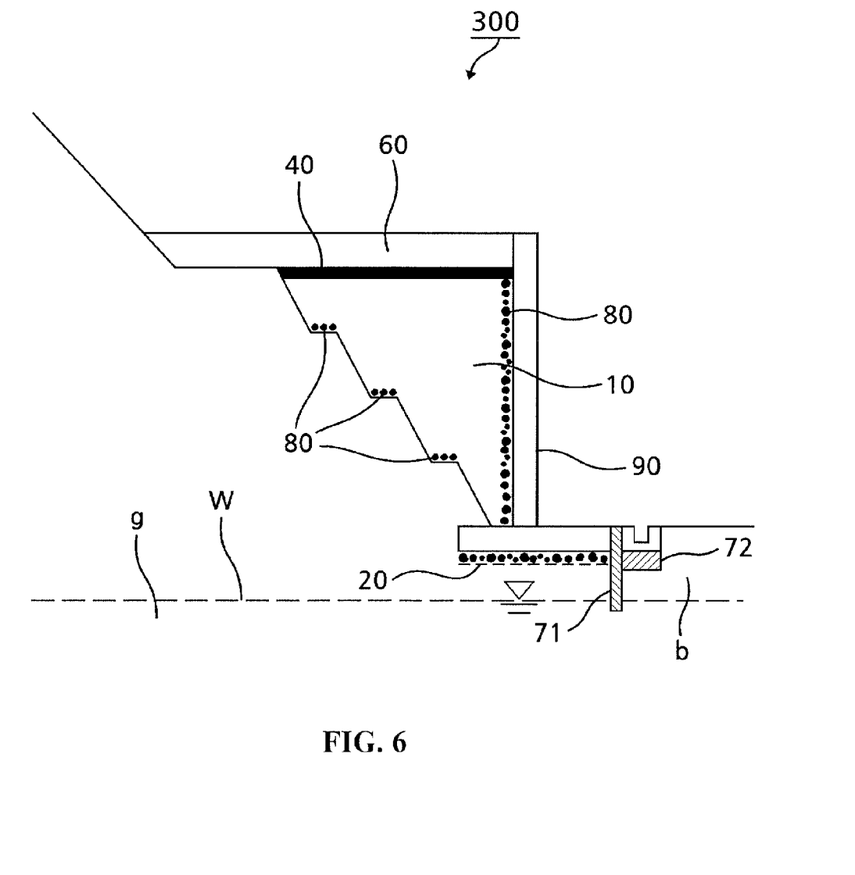
FIG. 6 is a schematic cross-sectional view of a banking structure according to a third embodiment of the present invention.

So far, although the cover layer 50 is symmetrically formed on both sides of the banking layer 10 in the embodiment of FIGS. 1 and 4, the cover layer 50 may not be formed on one side of the banking layer 10 as described in an embodiment of FIGS. 5 and 6, or a breast wall 90 may be installed on one side of the banking layer 10 as described in the embodiment of FIG. 6.

FIG. 5 is a schematic cross-sectional view of a banking structure according to a second embodiment, and FIG. 6 is a schematic cross-sectional view of a banking structure according to a third embodiment of the present invention.

Referring to FIGS. 5 and 6, in a second embodiment 200 and a third embodiment 300, banking structures 200 and 300 that are applied when one side of a slope is cut to form a road are illustrated.

In the second and third embodiments 200 and 300, a horizontal face and a slope face may be alternately formed on one surface of a banking layer 10 in a stair shape to stably maintain the banking layer 10. However, it may not be necessary to form the one surface of the banking layer 10 in the stair shape. For example, the one surface of the banking layer 10 may be formed in the form of the vertical face or the slope face.

In the second and third embodiments 200 and 300, the banking layer, a capillary breaker layer 20, a lower blocking layer 30, and an upper blocking layer 40 may have the same constitution and effect as those of the first embodiment of FIGS. 1 and 4.

In the second and third embodiments 200 and 300, a cover layer may not be provided on one side of the banking layer 10. Thus, the second and third embodiments are different from the first embodiment in that a neutralizing drain layer 80 that is formed by mixing gravels and a neutralizing agent is formed on a portion at which the horizontal face is formed.

The neutralizing drain layer 80 may drain acid drainage flowing along a slope toward a lower side surface of the banking layer 10 by using the gravels. In this process, the acid drainage may be neutralized by the limestone and gravels that are used as the neutralizing agents.

Also, in the third embodiment 300 of FIG. 6, the cover layer 10 may not be formed on all of both sides of the banking layer 10, but formed on only one side surface of the banking layer 10. Alternatively, as illustrated in FIG. 5, although the neutralizing drain layer 80 is provided on one side surface, a breast wall 90 may be installed on the other side surface of the banking layer 10. Also, the neutralizing drain layer 80 may be formed by mixing the gravels with the neutralizing agent on an outer portion of the banking layer 10 that is in contact with an inner surface of the breast wall 90 to guide the acid drainage downward. In this process, the acid drainage may be neutralized by the neutralizing agents such as the limestone and gravels. A non-explained reference symbol g of the reference symbols in the drawings may represent natural soil that is a target area of the banking structure 100, a non-explained reference symbol b may represent a basic layer that is provided as a base at a lower portion of the banking structure 100, and a non-explained reference symbol w may represent an underground water level.

As described above, in the utilization of the rocks having the acid drainage production possibility as the banking materials, the existing problems with respect to the production of the acid drainage may be multilaterally solved. That is, sulfide minerals and oxidizing agents may react with each other to fundamentally block the production of the acid drainage as well as to blockade various roots through which oxygen of rain or air meets the sulfide minerals. Also, a system for neutralizing the acid drainage before the acid drainage is discharged may be provided in preparation for the case in which the acid drainage is produced in the banking layer. The rocks may be used as the banking materials through the multilateral acid drainage prevention system in civil engineering and construction fields which suffer from shortage of aggregates.

In the banking structure using the rocks producing the acid drainage according to the present invention, the oxidization of the sulfide minerals may be prevented in the banking layer containing the sulfide minerals to restrict the production of the acid drainage. In addition, the introduction of the rain or air into the banking layer may be prevented to prevent the rain or air from acting as the oxidizing agent, and inversely, the discharge of the acid drainage produced from the banking layer to the outside may be prevented to stably recycle the rocks containing the sulfide minerals.

The description of the present invention is intended to be illustrative, and those with ordinary skill in the technical field of the present invention pertains will be understood that the present invention can be carried out in other specific forms without changing the technical idea or essential features. Hence, the real protective scope of the present invention shall be determined by the technical scope of the accompanying claims.

What is claimed is:

1. A banking structure using a rock producing acid drainage, the banking structure comprising:
    a banking layer comprising the rock having acid drainage production possibility and an inhibitor for reducing acid drainage production potential of the rock;
    a capillary breaker layer stacked between a lower portion of the banking layer and an underground water level surface to prevent underground water from being introduced into the banking layer by a capillary phenomenon;
    a finishing layer stacked on an upper portion of the banking layer; and
    a cover layer containing a neutralizing agent and formed on a side surface of the banking layer to neutralize the acid drainage produced from the banking layer; wherein the cover layer further comprises an organic matter, and the neutralizing agent and the organic matter are mixed in a range of about 3% by weight to about 15% by weight with respect to the whole cover layer.

2. The banking structure of claim 1, further comprising a lower blocking layer formed of a material having a low permeability coefficient and stacked between the banking layer and the capillary breaker layer to prevent the acid drainage produced from the rock from being discharged downward.

3. The banking structure of claim 1, further comprising an upper blocking layer formed of a material having a low permeability coefficient and stacked on an upper portion of the banking layer to prevent rain from being introduced into the rock.

4. The banking structure of claim 1, further comprising a lower blocking layer formed of a material having a low permeability coefficient and stacked between the banking layer and the capillary breaker layer to prevent the acid drainage produced from the rock from being discharged downward, and an upper blocking layer formed of a material having a low permeability coefficient and stacked on an upper portion of the banking layer to prevent rain from being introduced into the rock,
    wherein an additional neutralizing agent for neutralizing the acid drainage produced from the rock is mixed into the lower blocking layer, and
    the neutralizing agent is mixed into the upper blocking layer.

5. The banking structure of claim 1, wherein the cover layer containing the organic matter is capable of being dissolved by microorganisms using oxygen and formed on the side surface of the banking layer to prevent oxygen in the atmosphere or dissolved oxygen of rain from being introduced into the banking layer.

6. The banking structure of claim 5, wherein the organic matter is continuously supplied into the cover layer by planting plants at the cover layer.

7. The banking structure of claim 1, further comprising a drain layer on a lower side surface of the banking layer,
    wherein an additional neutralizing agent is disposed in the drain layer.

8. The banking structure of claim 1, wherein, when acid production potential of the rock is above a reference value, upper and lower portions of the banking layer has the same width, and
    when the acid production potential of the rock is below the reference value, the lower portion of the banking layer has a width greater than that of the upper portion to increase a usage amount of rock.

9. The banking structure of claim 1, wherein a horizontal face and a slope face are alternately formed on one side surface of the banking layer, and
    an additional neutralizing drain layer in which gravels and a neutralizing agent are mixed is further disposed on the horizontal face.

10. The banking structure of claim 1, further comprising a breast wall on a side surface of the banking layer,
    wherein the neutralizing drain layer in which the gravels and the neutralizing agent are mixed is further disposed on a portion of the banking layer that is in contact with an inner surface of the breast wall.

11. The banking structure of claim 1, wherein the finishing layer comprises a road pavement layer.

12. The banking structure of claim 1, wherein the inhibitor comprises at least one of a coating agent that is applied to an acid rock to block contact with an oxidizing agent and an alkaline agent bonded to and precipitated together with $Fe^{3+}$ that acts as the oxidizing agent of the acid rock.

13. The banking structure of claim 12, wherein the coating agent comprises a solution in which hydrogen peroxide and phosphate are mixed, and the coating agent is sprayed and applied onto the acid rock.

\* \* \* \* \*